United States Patent [19]

Hong

[11] Patent Number: 5,549,234
[45] Date of Patent: Aug. 27, 1996

[54] FASTENER SYSTEM

[76] Inventor: Wong Y. Hong, 158 Jalan Dato Sulaiman, Post Code 80250 Century Garden, Johor Bahru, Johor, West, Malaysia

[21] Appl. No.: 498,374

[22] Filed: Jul. 5, 1995

Related U.S. Application Data

[63] Continuation of Ser. No. 254,700, Jun. 6, 1994, abandoned.

[51] Int. Cl.$^6$ .................... B25C 5/00; B25C 7/00
[52] U.S. Cl. ............... 227/119; 227/147; 248/304; 411/400; 411/401; 411/485
[58] Field of Search .............. 227/9, 147, 119; 411/485, 400, 401, 394; 248/489, 301, 303, 304

[56] References Cited

U.S. PATENT DOCUMENTS

| | | | |
|---|---|---|---|
| 2,601,872 | 7/1952 | Kaufmann | 248/304 |
| 3,224,721 | 12/1965 | Malmquist | 248/303 |
| 3,602,419 | 8/1971 | Doberne et al. | 227/147 |
| 3,797,721 | 3/1974 | Clumb | 227/9 |
| 4,709,841 | 12/1987 | Wollar | 227/147 |
| 5,123,584 | 6/1992 | Harrison | 227/147 |

FOREIGN PATENT DOCUMENTS 686222  3/1965  Italy ................... 411/485

*Primary Examiner*—Scott A. Smith
*Attorney, Agent, or Firm*—Donald A. Kettlestrings

[57] ABSTRACT

A fastener system includes a fastener and a tool for use with the fastener. The fastener includes a shank defining a first pointed end and an opposed second end, and a plate is connected to the second end. A first head is connected to the plate and the head defines a first opening therethrough and a slot which extends from the opening through an exterior surface of the head. The tool is configured for cooperation with the fastener for attaching the fastener to a wall, ceiling or other surface.

3 Claims, 5 Drawing Sheets

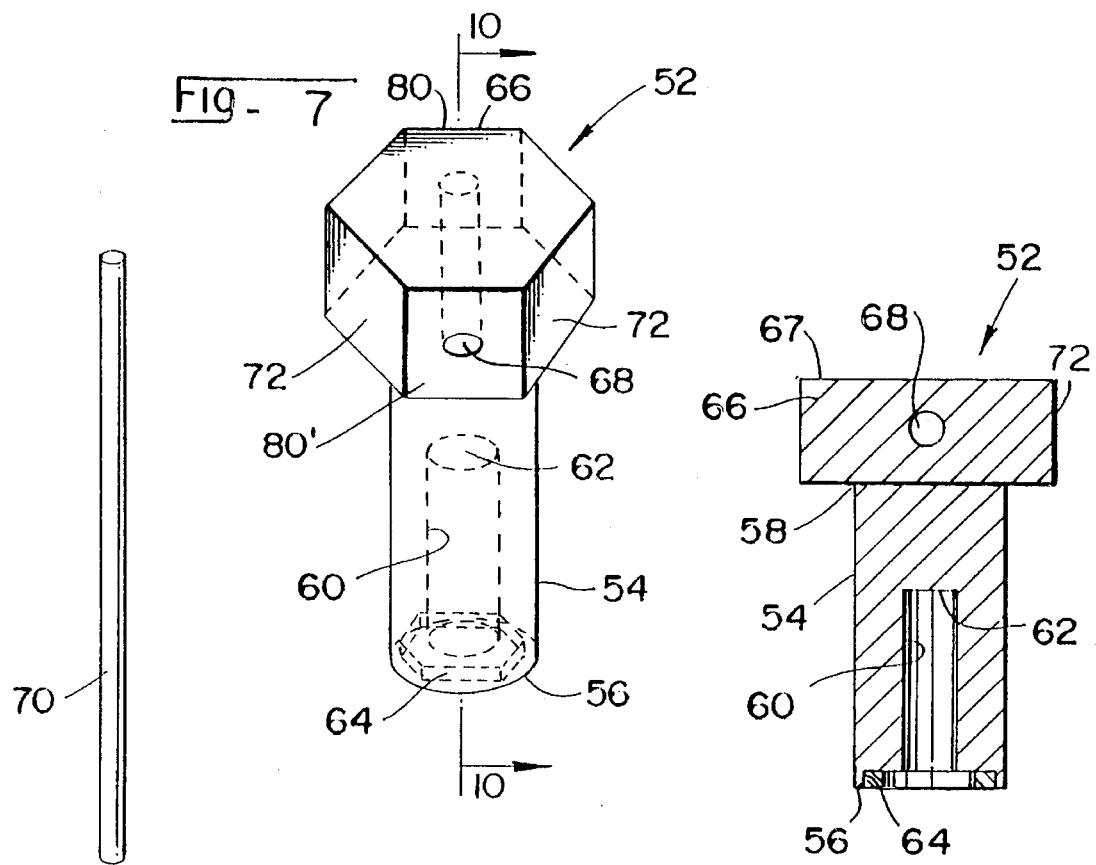

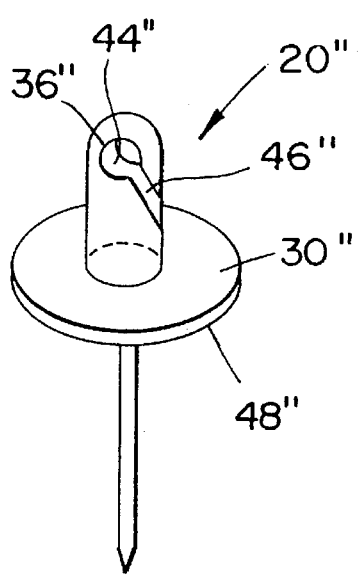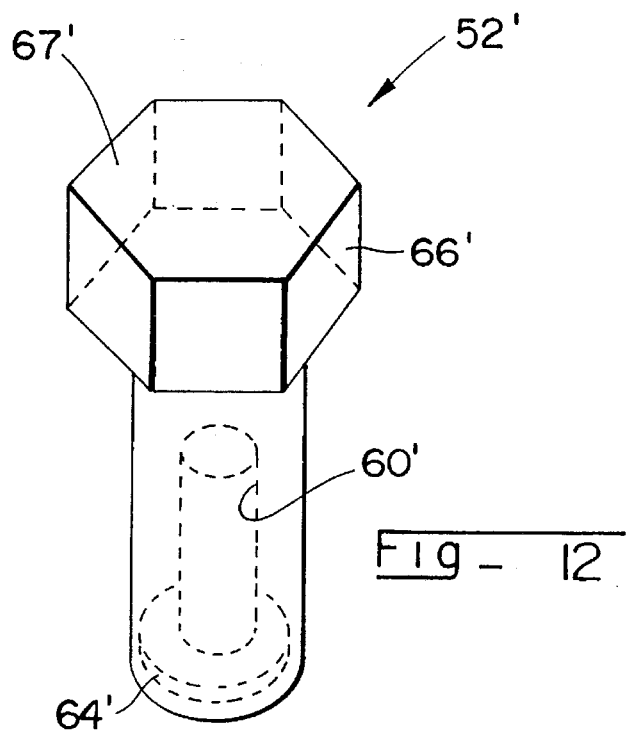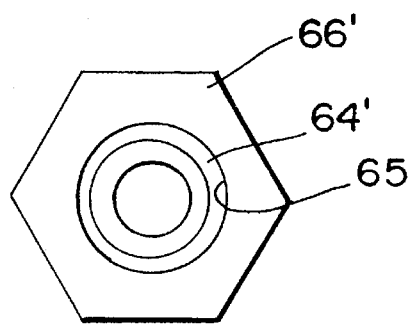

5,549,234

FASTENER SYSTEM

This application is a continuation of application Ser. No. 08/254,700 filed Jun. 6, 1994, abandonded.

BACKGROUND OF THE INVENTION

This invention relates to a fastener system which includes a fastener and a tool for use with the fastener. More particularly, this invention relates to a fastener system for hanging pictures or the like from walls, ceilings or other surfaces.

An object of the present invention is the provision of a fastener system which call be quickly and conveniently used for hanging pictures or the like from walls or ceilings.

Another object is to provide a fastener for hanging pictures or the like from walls or ceilings.

A further object of the invention is the provision of a tool for use with the fastener of this invention which permits the quick and easy installation of the fastener.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a fastener system which includes a fastener having a shank with a longitudinal axis and which defines a first pointed end and an opposed second end. A plate is connected to the second end, and the plate defines first and second opposed and substantially parallel flat surfaces. A first head is connected to the plate and the head includes a first substantially cylindrical portion connected to the plate and the head further includes a second substantially semi-spherical portion connected to the first portion. The fastener system further includes a tool for use with the fastener for attaching the fastener to a wall, ceiling or other surface.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate examples of preferred embodiments of the invention and, together with the description, serve to explain the principles of the invention.

FIG. 7 is a perspective view of a tool for use with the fasteners shown in FIGS. 1 and 2;

FIG. 8 is a bottom plan view of the tool shown in FIG. 7;

FIG. 9 is a top plan view of the tool shown in FIG. 7;

FIG. 10 is a cross-sectional view of the tool shown in FIG. 7 and looking in the direction of the arrows;

FIG. 11 shows a rod for use with the tool shown in FIG. 7;

FIG. 12 is a perspective view of another tool embodiment;

FIG. 13 is a bottom plan view of the tool shown in FIG. 12;

FIG. 14 is a perspective view of a third fastener embodiment; and

DESCRIPTION OF THE PREFERRED EMBODIMENTS

Figure 6:
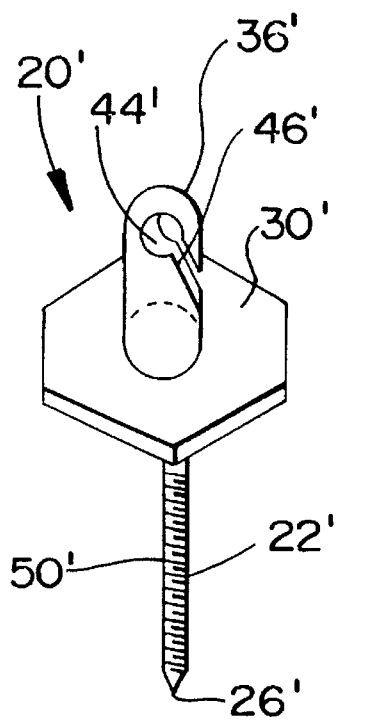
FIG. 6 is a perspective view of a second fastener embodiment.
Figure 1:
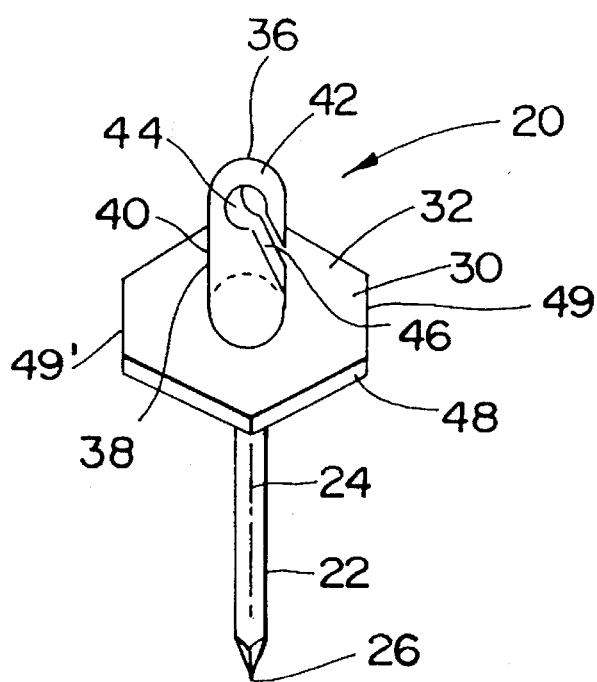
FIG. 1 is a perspective view of one fastener embodiment.
Figure 4:
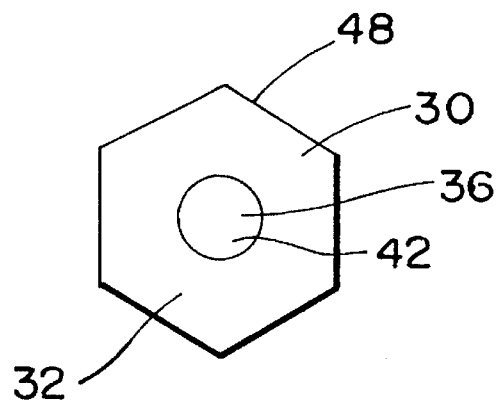
FIG. 4 is a top plan view of the fastener shown in FIG. 1.
Figure 3:
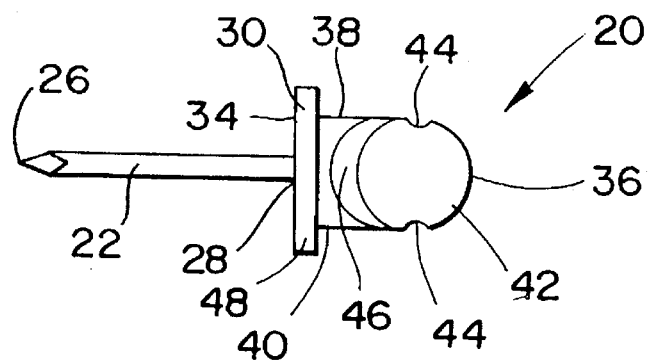
FIG. 3 is a second side elevation view of the fastener shown in FIG. 1.
Figure 2:
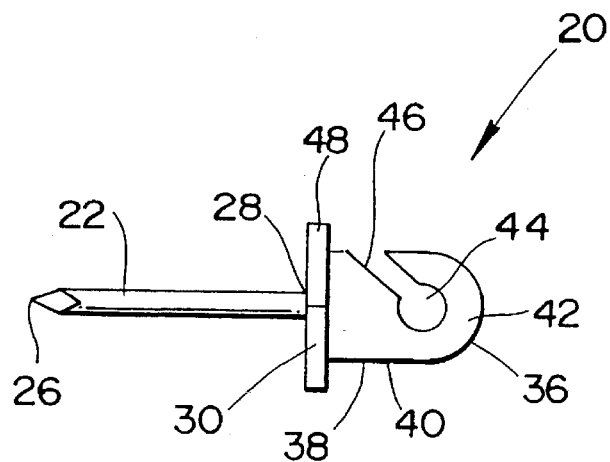
FIG. 2 is a first side elevation view of the fastener shown in FIG. 1.
Figure 5:
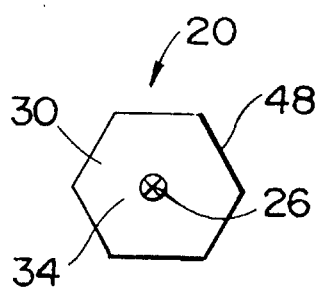
FIG. 5 is a bottom plan view of the fastener shown in FIG. 1.

With reference now to the drawings, wherein like reference characters designate like or corresponding parts throughout the several views, there is shown in FIGS. 1–5 a fastener 20 which comprises a shank 22 having a longitudinal axis 24 and which defines a first pointed end 26 and an opposed second end 28.

Fastener 20 further includes a plate 30 which is connected to second end 28. Plate 30 defines first and second opposed and substantially parallel flat surfaces 32, 34, and a first head 36 is connected to plate 30. Surfaces 32, 34 are preferably positioned at right angles to axis 24.

In accordance with the invention, head 36 includes a first substantially cylindrical portion 38 connected to first flat surface 32 of plate 30, and cylindrical portion 38 defines a substantially cylindrical exterior surface 40. Head 36 further includes a second substantially semi-spherical portion 42 connected to first portion 38, and first and second portions 38, 42, together, define a first predetermined overall length.

Second substantially semi-spherical portion 42 of head 36 defined a first opening 44 therethrough, and head 36 further defines a slot 46 which extends from first opening 44 and through exterior surface 40 of first portion 38.

Plate 30 of fastener 20 defines a multi-sided perimeter edge 48 between first and second surfaces 32, 34. In a preferred embodiment of fastener 20, multi-sided perimeter edge 48 defines a hexagonal shape with six separate sides.

Shank 22 of fastener 20 defines an outer substantially smooth surface so that shank 22 with pointed end 26 acts as a nail.

An alternative embodiment fastener 20' is illustrated in FIG. 6. Each of the elements of fastener 20' is identical to those of fastener 20 with the exception that shank 22' of fastener 20' defines an outer threaded surface 50'. As a result, shank 22' with pointed end 26' acts as a screw.

The fastener system of this invention further includes a tool 52 for use with fasteners 20, 20'. (See FIGS. 7–11) Tool 52 includes a body portion 54 which defines first and second opposed ends 56, 58. Body portion 54 further defines a substantially cylindrical opening 60 which extends from first open end 56 of body portion 54 into body portion 54. Cylindrical opening 60 defines a second predetermined length greater than the first predetermined overall length of heads 36, 36' of fasteners 20, 20' so that heads 36, 36' will fit within cylindrical opening 60 without having heads 36, 36' contact closed end 62 when the heads of fasteners 20, 20' are positioned within cylindrical opening 60.

Cylindrical opening 60 within tool 52 defines a multi-sided countersunk portion 64 at first open end 56 of body portion 54, and countersunk portion 64 is sized and configured for removably receiving multi-sided plates 30, 30' of fasteners 20, 20' therein.

In accordance with the invention, a second head 66 is connected to second end 58 of body portion 54, and a second opening 68 extends through second head 66 for removably receiving a rod 70 therein. Rod 70 is sized to removably fit within and extend beyond the ends of second opening 68. Head 66 of tool 52 preferably defines a multi-sided perimeter surface 72, and perimeter surface 72 is preferably hexagonal in shape to define six separate sides.

An alternative embodiment tool 52' is illustrated in FIGS. 12 and 13. Tool 52' is used with a fastener 20" shown in FIG. 14, wherein plate 30" is not multi-sided but substantially circular in configuration. It should be understood, however, that plate 30" could be oval in shape or could be one of any number of other shapes which have a single continuous outer surface or perimeter edge 48".

Each of the sides of multi-sided perimeter surface 72 of tool 52 (FIGS. 7-10) is preferably aligned in substantially parallel relationship with one of the multiple sides of countersunk portion 64. This will enable tool 52 to be quickly and easily positioned with respect to plates 30, 30' when tool 52 is used to attach fasteners 20, 20' to a wall, ceiling or other surface. Tool 52 can be used with either fastener 20 or fastener 20', but tool 52' is configured for use only with fastener 20". Tool 52' is identical to tool 52 with the exception that tool 52' is not provided with opening 68 through its head 66' and countersunk portion 64' is not multi-sided. Rather, countersunk portion 64' defines a single continuous outer surface 65, and outer surface 65 is preferably substantially circular. It should be understood, however, that the configuration of outer surface 65 can be oval or any one of a number of other shapes which will permit plate 30" to fit within countersunk portion 64'.

Heads 36, 36', 36" and plates 30, 30', 30", of fasteners 20, 20', 20" are preferably fine finished and painted with any desirable color.

When using fastener 20, a hole 74 (FIG. 15) is drilled or otherwise formed within wall or other surface 76. A hollow, tubular sleeve 78 is then inserted into hole 74. Fastener 20 is then positioned with pointed end 26 against the tubular opening of sleeve 78, and slot 46 is positioned upwardly or at a substantially right angle with respect to horizontal. This orientation of fastener 20 is aided by the fact that sides 49, 49' of plate 30 are positioned in horizontal positions when slot 46 is oriented upwardly or perpendicularly to horizontal. Fastener 20 is then driven into sleeve 78 and into hole 74 by use of tool 52.

Figure 15:
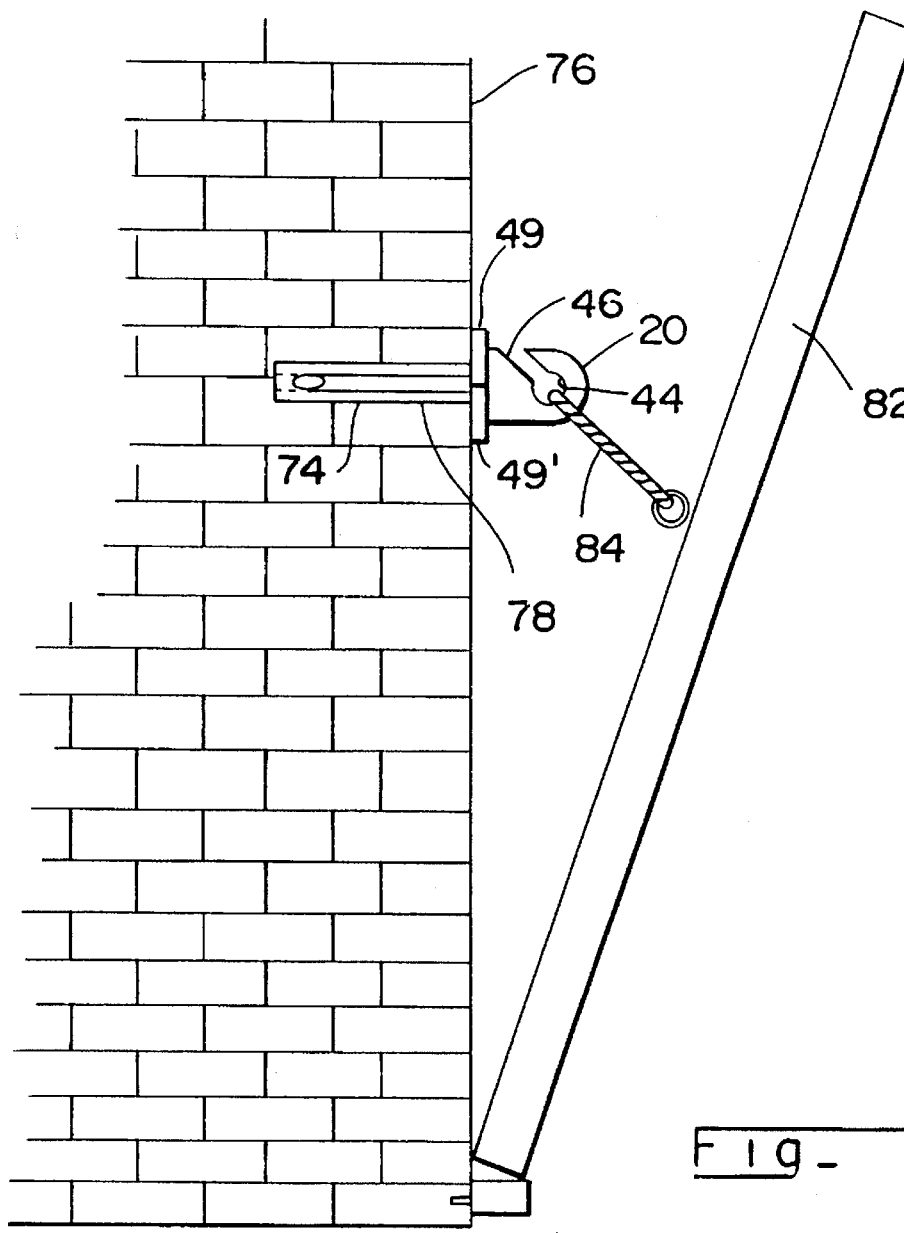
FIG. 15 is a diagramatic side elevation view showing the fastener illustrated in FIG. 1 as it is used to hang a picture from a wall.

Opposed sides 80, 80' of hexagonally sided head 66 of tool 52 are oriented horizontally as head 36 of fastener 20 is positioned within cylindrical opening 60 of tool 52. The hexagonal sides of countersunk portion 64 are positioned in substantially parallel relationship with each of the sides of head 66 so that countersunk portion 64 will engage and receive plate 30 therein widen sides 49, 49' of plate 30 are positioned in horizontal directions. The length of cylindrical opening 60 within tool 52 is longer than the overall length of head 36 of fastener 20 so that the end of head 36 does not contact closed end 62 of cylindrical opening 60. A hammer or other impacting tool (not shown) is then used to hit against surface 67 of head 66 to drive the nail into wall or surface 76 and into hollow, tubular sleeve 78. The driving force of the hammer against surface 67 is transmitted by tool 52 to plate 30 of fastener 20 via countersunk portion 64. Head 36 of fastener 20, as a result, does not receive any striking forces, and the finished surface of head 36 is not marred. Tool 52 is then removed from fastener 20, and a picture 82 or other object (FIG. 15) is then hung from fastener 20 by inserting string 84 into slot 46 and into opening 44 of fastener 20. Both ends of opening 44 are smooth and rounded so that string 84 will not be cut by sharp edges. FIG. 15 shows the positioning of a picture as described.

Fastener 20" and tool 52' are used in the same manner as previously described, bull plate 30" of fastener 20" and countersunk portion 64' of tool 52' are configured so that each has a single, substantially continuous outer edge or perimeter surface. As shown in FIGS. 12–14, plate 30" and countersunk portion 64' are substantially circular.

Fastener 20" is positioned within hollow, tubular sleeve 78 with slot 46" positioned vertically and at substantially a right angle with respect to horizontal. Tool 52' is then positioned over fastener 20" in the manner previously described with respect to fasteners 20, 20' and tool 52. A hammer or other tool (not shown) is then used to impact surface 67' of tool 52' so that fastener 20" is driven into sleeve 78. As in the previously described embodiments, countersunk portion 64' of tool 52' engages plate 30" of fastener 20", and head 36" of fastener 20" does not receive any blows or punching forces because the overall length of head 36" is less than the length of cylindrical opening 60'.

Use of fastener 20' with tool 52 is the same as that described with respect to fastener 20 and tool 52 with the exception that rod 70 (FIG. 11) is inserted into and through opening 68 within tool 52. Rod 70 is then used to turn and rotate tool 52, and turning forces are transmitted to fastener 20' by means of multi-sided countersunk portion 64 of tool 52 engaging multi-sided plate 30' of fastener 20'. It is preferred that the threads on threaded surface 50' of fastener 20' extend along the entire length of shank 22'.

Plates 30, 30' and 30" in each of the fasteners cover hole 74 and tubular sleeve 78. Each of the fasteners provides a safe way for pictures or other items to be hung because string 84 rests within openings 44, 44' and 44' and slots 46, 46', 46" prevent string 84 from falling out of openings 44, 44' and 44". Fastener 20' with threaded surface 50' is particularly useful for hanging items from a ceiling.

The invention in its broader aspects is not limited to the specific details shown and described, and departures may be made from such details without departing from the principles of the invention and without sacrificing its chief advantages.

What is claimed is:

1. A fastener system comprising:

a fastener including a shank having a longitudinal axis and defining a first pointed end and an opposed second end, a plate connected to said second end, said plate defining first and second opposed and substantially parallel flat surfaces and a perimeter edge between said first and second surfaces, a first head connected to said plate, said head defining a first opening therethrough and an exterior surface and a slot extending from said first opening through said exterior surface, and said head defining a first predetermined overall length;

a tool for use with said fastener for attaching said fastener to a surface, said tool including a body portion defining first and second opposed ends and further defining a substantially cylindrical opening extending from said first end of said body portion into said body portion, said cylindrical opening defining a second predetermined length greater than said first predetermined overall length, and said cylindrical opening within said body portion defining a countersunk portion at said first end of said body portion sized and configured for removably receiving said plate therein; and wherein said shank defines an outer threaded surface, said perimeter edge is multi-sided, said countersunk portion is multi-sided, a second head is connected to said second end of said body portion, a second opening is defined within and extends through said second head, and further including a rod sized to removably fit within and to extend beyond said second opening.

2. A fastener system comprising:

a fastener including a shank having a longitudinal axis and defining a first pointed end and an opposed second end, a plate connected to said second end, said plate defining first and second opposed and substantially parallel flat surfaces and a perimeter edge between said first and second surfaces, a first head connected to said plate, said head defining a first opening therethrough and an exterior surface and a slot extending from said first opening through said exterior surface, and said head defining a first predetermined overall length;

a tool for use with said fastener for attaching said fastener to a surface, said tool including a body portion defining first and second opposed ends and further defining a substantially cylindrical opening extending from said first end of said body portion into said body portion, said cylindrical opening defining a second predetermined length greater than said first predetermined overall length, and said cylindrical opening within said body portion defining a countersunk portion at said first end of said body portion sized and configured for removably receiving said plate therein;

wherein said first head includes a first substantially cylindrical portion connected to said plate and defining an exterior surface, and wherein said first head further includes a second substantially semi-spherical portion connected to said first portion, said first and second portions together defining a first predetermined overall length;

wherein said second portion of said first head defines said first opening therethrough and wherein said first head defines a slot therein which extends from said first opening through said exterior surface of said first portion; and wherein said shank defines an outer threaded surface, said perimeter edge is multi-sided, said countersunk portion is multi-sided, a second head is connected to said second end of said body portion, a second opening is defined within and extends through said second head, and further including a rod sized to removably fit within and to extend beyond said second opening.

3. A fastener system comprising:

a fastener including a shank having a longitudinal axis and defining a first pointed end and an opposed second end, a plate connected to said second end, said plate defining first and second opposed and substantially parallel flat surfaces and a perimeter edge between said first and second surfaces, a first head connected to said plate, said head defining a first opening therethrough and an exterior surface and a slot extending from said first opening through said exterior surface, and said head defining a first predetermined overall length;

a tool for use with said fastener for attaching said fastener to a surface, said tool including a body portion defining first and second opposed ends and further defining a substantially cylindrical opening extending from said first end of said body portion into said body portion, said cylindrical opening defining a second predetermined length greater than said first predetermined overall length, and said cylindrical opening within said body portion defining a countersunk portion at said first end of said body portion sized and configured for removably receiving said plate therein; and wherein said shank defines an outer substantially smooth surface, said perimeter edge is multi-sided, said countersunk portion is multi-sided, and a second head is connected to said second end of said body portion, a second opening is defined within and extends through said second head, and further including a rod sized to removably fit within and to extend beyond said second opening.

* * * * *